United States Patent [19]

McDermott et al.

[11] Patent Number: 4,658,909

[45] Date of Patent: Apr. 21, 1987

[54] VEHICLE MOUNTED AERATING MACHINE

[75] Inventors: Brian P. McDermott, Mermaid Waters; David J. Livingstone, Sylvania Waters, both of Australia

[73] Assignee: Greencare Pty., Limited, Sylvania Waters, Australia

[21] Appl. No.: 715,463

[22] Filed: Mar. 25, 1985

[51] Int. Cl.$^4$ .................... A01B 45/02; A01B 35/28
[52] U.S. Cl. ........................................ 172/22; 172/95
[58] Field of Search ................ 172/21, 22, 88, 89, 172/93, 95, 94

[56] References Cited

U.S. PATENT DOCUMENTS

| | | | |
|---|---|---|---|
| 1,853,079 | 4/1932 | Plant | 172/21 X |
| 2,056,337 | 10/1936 | Archibald | 172/21 |
| 2,730,028 | 1/1956 | Oswalt | 172/21 |
| 3,490,540 | 1/1970 | West et al. | 172/21 |
| 3,743,025 | 7/1973 | Thatcher | 172/21 |
| 3,802,513 | 4/1974 | Ploenges | 172/21 |
| 3,834,464 | 9/1974 | Carlson et al. | 172/22 |
| 3,926,131 | 12/1975 | Collins | 172/21 X |
| 4,084,642 | 4/1978 | Killion | 172/21 |
| 4,154,305 | 5/1979 | Prewett | 172/21 |
| 4,212,357 | 7/1980 | Clements et al. | 172/22 |
| 4,569,400 | 2/1986 | Minagawa et al. | 172/21 |

FOREIGN PATENT DOCUMENTS

| | | | |
|---|---|---|---|
| 661287 | 11/1951 | United Kingdom | 172/21 |
| 1347967 | 2/1974 | United Kingdom | 172/21 |

OTHER PUBLICATIONS

Howard Rotavator Company, Sales Literature, "Howard Turf-Quaker/The Model HA-TQ," Feb. 1980, (Form 966/Z-80/35M/IL).

Primary Examiner—Richard J. Johnson
Assistant Examiner—Terrence L. B. Brown
Attorney, Agent, or Firm—Holman & Stern

[57] ABSTRACT

A turf aerating machine including a plurality of tyne arms, having tynes attached to their lower ends, and extending substantially vertically downwardly from the cranks of a crankshaft located transversely of the direction of travel of the aerator. A drive linkage connects the crankshaft to the power take-off of the tractor or other power source and is driven such that, as the aerator is moved forward, the crankshaft moves with the lower arc of its rotation in the rearward direction. The tyne arms are projected into the ground as the respective crank moves through its lower arc and they are lifted clear of the ground as the crank moves through the upper arc of its travel. While the tynes are engaged with the ground, the tyne arm is maintained in a substantially vertical orientation by the rearward motion of the respective crank through the lower arc of its rotation. The lower end of each tyne arm extends through a slot running longitudinally of the aerator such that lateral movement of the tyne arm is prevented. Each tyne arm is biased toward the forward end of its slot when the tyne is engaged in the ground due to the forward motion of the aerator over the ground. When the tyne is retracted from the ground by the crankshaft the tyne arm is returned to the forward end of its slot by the spring.

9 Claims, 11 Drawing Figures

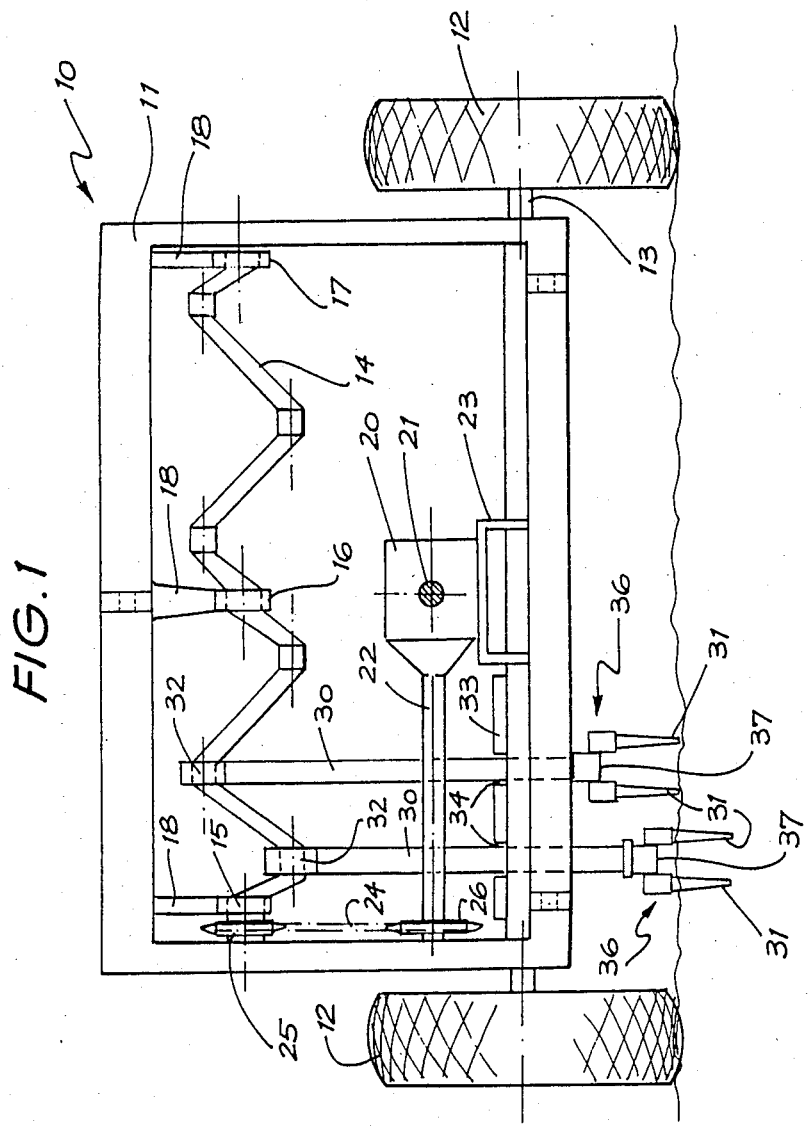

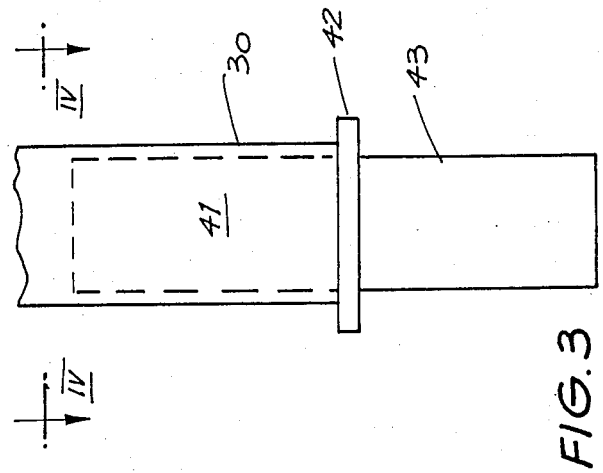
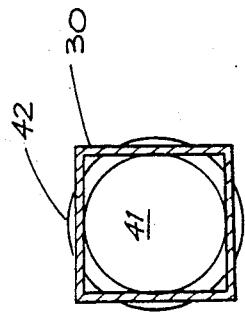
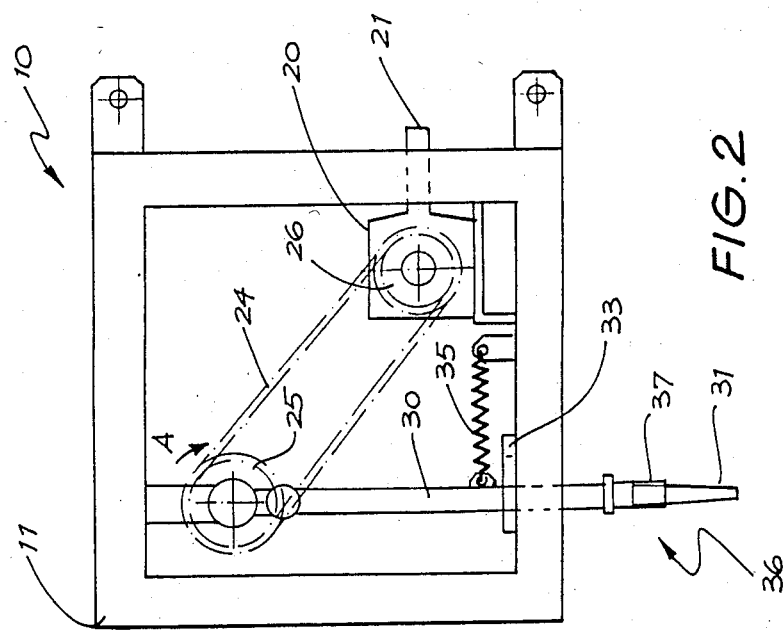

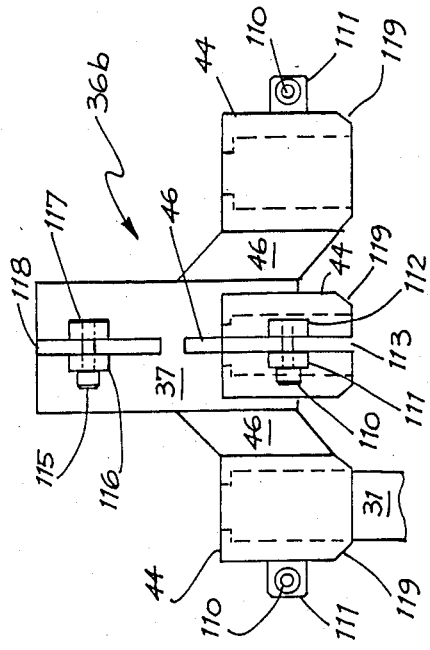
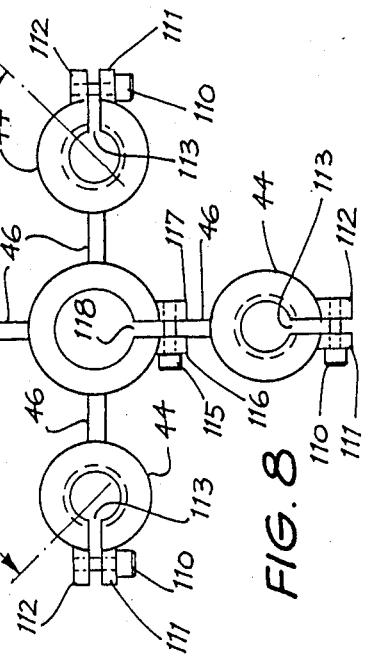
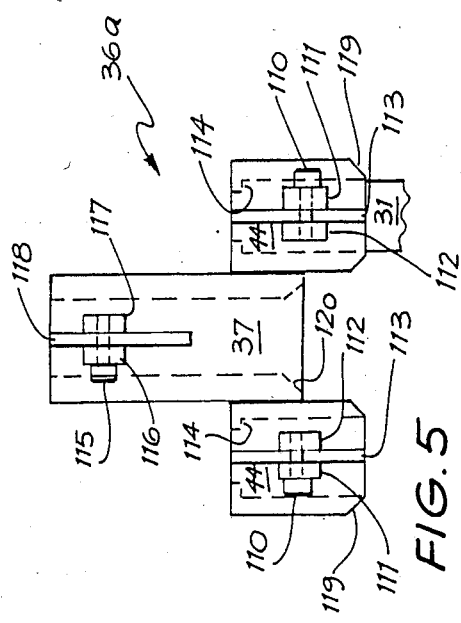
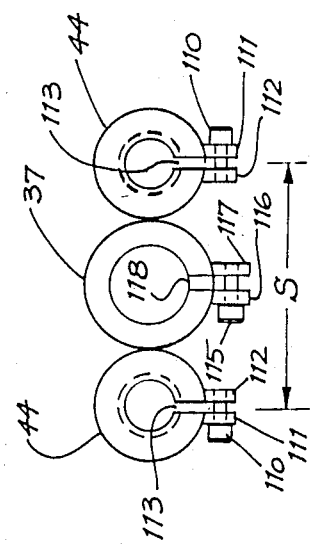

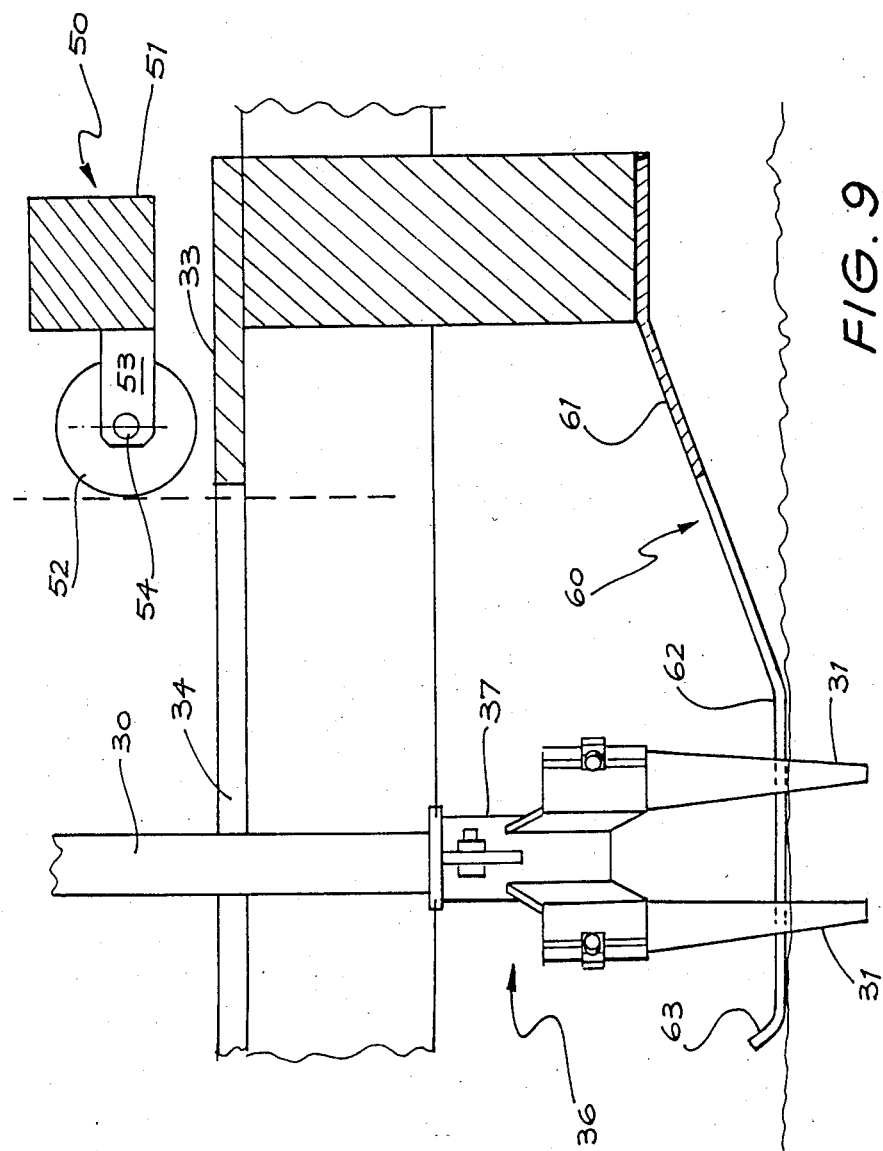

VEHICLE MOUNTED AERATING MACHINE

BACKGROUND OF THE INVENTION

The present invention relates generally to turf aerators and in particular provides a turf aerator which is simple to manufacture and repair.

Prior art turf aerators are known, which support a plurality of reciprocable tynes adapted to be forced into the ground at regular intervals to aerate the ground. Such prior art aerators are usually self propelled and include mechanical/hydraulic support means for the tynes, and a timing mechanism which provides a "lost motion" type movement of the tynes such that the tynes reciprocate and engage the ground in a substantially vertical plane as the machine advances. To date the available aerators have been either of very basic form, similar to a reciprocating broad fork in which the tynes extend down from a common reciprocating bar or the like and which do not give very satisfactory results, or they have been of complex form which work satisfactorily but which are difficult to service and expensive to manufacture.

In one prior art arrangement an aerator has a plurality of tynes located at the ends of tyne arms which are reciprocated by a crankshaft and arranged transversely of the aerator. The tyne arms are each slidably mounted, towards their lower end in a guide which is in turn reciprocated fore and aft to keep the tyne arm vertical while it is in engagement with the ground. The prior art tyne arms are articulated to accommodate the differing relative horizontal speeds of the crankshaft and the arm guides which maintain the lower portion of the arms in vertical orientation. Typically when an aerator is required to penetrate the ground at 50 mm spacings, the machine can only move forward 50 mm for every revolution of the crankshaft and therefore a relatively high tyne speed is required for reasonable rate of coverage. Due to their mechanical arrangement, prior art machines were subject to high rates of wear and usually required strict mechanical timing means to control the placement of tynes as the machine advanced. Further, these prior art machines are able to provide only one timing pattern with respect to forward speed and can therefore only produce one coring pattern.

Various embodiments of the present invention are designed to ameliorate the disadvantages mentioned above.

SUMMARY OF THE INVENTION

Accordingly, the invention provides an aerator for turf and adapted to be propelled over a turfed surface, said aerator including:
an aerator frame;
at least two ground engaging wheels mounted relative to the frame;
a crankshaft rotatably mounted relative to the frame and extending transversely to the direction of travel of the frame;
a plurality of rigid tyne arms mounted relative to the crankshaft for reciprocation by the crankshaft;
at least one tyne substantially rigidly mounted relative to each tyne arm;
drive means mounted on the frame for rotating the crankshaft; and
guide means controlling the movement of the tyne arms, whereby rotation of said crankshaft causes the tyne arms to reciprocate in a substantially vertical direction relative to the turf to project the tynes into and withdraw them from the turf whilst allowing the tynes to remain stationary, horizontally, relative to the turf when the tynes are in the turf and the vehicle is moving.

Preferably the guide means include means for biasing the tyne arms to the forward end of their travel when the tynes are lifted from the ground. The biassing means will preferably comprise tension springs, although other biassing means such as pneumatic and hydraulic cylinders, compression springs and resilient rubber or plastics members would also be suitable.

Both self propelled and towable embodiments of the invention are provided.

BRIEF DESCRIPTION OF THE DRAWINGS

Embodiments of the invention will now be described by way of example with reference to the accompanying drawings in which:

FIG. 1 is an end view of a first embodiment of an aerator according to the invention which is adapted to be towed;

FIG. 2 schematically illustrates is a side view of the aerator of FIG. 1 with wheels and associated mounting gear removed;

FIG. 3 is a side view of an end portion of a tyne arm;

FIG. 4 is a sectional plan view of the tyne arm when viewed through section line IV—IV of FIG. 3;

FIG. 5 is a side view of a tyne foot adopted to mount on the tyne arm of FIGS. 3 and 4;

FIG. 6 is a plan view of the tyne foot of FIG. 5;

FIG. 7 is a side view of a second tyne foot adapted to mount on the tyne arm of FIGS. 3 and 4;

FIG. 8 is a plan view of the tyne foot of FIG. 7;

FIG. 9 is a side detailed view of a portion of the aerator shown in FIGS. 1 and 2;

DETAILED DESCRIPTION OF THE INVENTION

Figure 10:
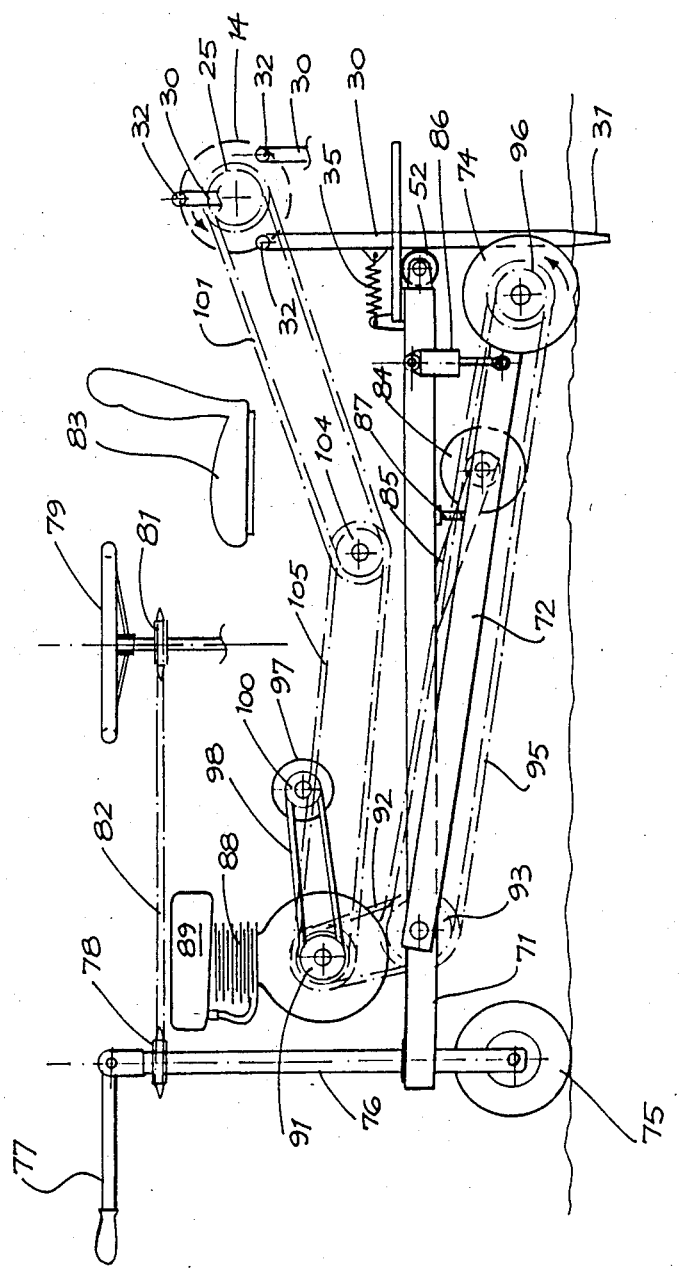
FIG. 10 schematically illustrates a side view of a second embodiment of an aerator according to the present invention, adapted to be self propelled.

Referring to FIGS. 1 and 2 an aerator 10 in accordance with the present invention has a frame 11 to which are mounted at least two ground engaging wheels 12. These wheels are mounted for rotation about an axle 13 extending tranversely of the aerator and the wheels may function as depth wheels to provide for adjustability of the height at which the aerator travels over the ground. In one form the axle 13 may have a cranked portion and the position of this portion relative to the frame may be adjusted to provide for this height adjustment. This adjustment enables the height of the aerator to be varied to achieve varying depth of penetration of the tynes during operation of the aerator. When the aerator is to be transported from one site to another, it is raised from the ground on the three point linkage of the tractor to which it is connected.

The aerator 10 has a crankshaft 14 extending transversely of the frame 11. The crankshaft is supported by main bearings 15, 16 and 17 and carried by support members or bearing mounts 18 integral with the frame 11. Whilst only one crankshaft 14 is illustrated, where a wider aerator is required two crankshafts 14 may be coupled end to end.

The aerator includes drive means for rotating the crankshaft. The drive means illustrated comprises a gearbox 20 having an input shaft 21 and an output shaft 22, the input shaft 21 being capable of being coupled to a power take off of the towing vehicle. The gearbox is fixed relative to mount 23 secured to a member of the frame 11 and the crankshaft 14 may be suitably driven from the gearbox via a drive chain 24 extending over drive sprockets 25, 26. Where there are two crankshafts they may be driven by respective drive chains from the output shaft of the gearbox or alternatively by a duplex chain meshing with respective single sprockets on adjacent ends of the crankshafts. Alternatively the shafts may be driven from their remote ends via suitable drives from spaced take off means on a common shaft or from the opposite ends of a conventional vehicle rigid rear driving axle assembly. A chain connection is convenient since it permits the respective crankshafts 14 to be timed with respect to one another to place the throws of one shaft out of phase with the throws of the adjacent shaft. This has the advantage of staggering tyne arms 30 and hence tynes 31 engage the ground in a staggered fashion resulting in smoother operation of the aerator. By using a crankshaft on which the respective cranks are offset with respect to one another, the energy required to drive the tynes into the ground is spread more evenly over the rotational cycle of the crankshaft, thereby reducing peak power requirements and reducing the forces applied to the mechanical drive components of the aerator.

Tyne arms 30 are mounted relative to the crankshaft with a bearing 32 located between the upper end of each arm 30 and the crankshaft. The frame has a transverse frame member 33 formed with a plurality of slots 34 within which the arms 30 are located and travel. The arms are biased towards the front of the slots by respective springs 35 and these slots act as guides for fore and aft movement of the arms.

Mounted at the lower end of each arm 30 is a tyne foot 36 which carries at least one tyne, however, two or more tynes can be carried by the foot to provide different core patterns or to increase operating speed. The foot may be formed integral with the arm 30 althought it is preferred that it be detachable, and to this end the foot may have a sleeve 37 which may be mounted about the lower end of the arm 30 and secured thereto by a clamp 38.

The lower end of one of the tyne arms 30 is illustrated in elevation and section plan in FIGS. 3 and 4. The tyne arm 30 is substantially formed from square section tube. A rod 41 is inserted into the lower end of the tyne arm 30 and a flange 42 locates the rod relative to the tyne arm. The rod 41 is then welded to the tyne arm to form a rigid assembly. The lower portion 43 of the rod 41 which projects from the tyne arm 30 provides a stub to which the tyne feet 36 are clamped.

Embodiments of the foot 36 are shown in FIGS. 5 to 8, and referring to FIGS. 5 and 6, a first foot 36a comprises a central tube 37 to which are welded a pair of tyne holding tubes 44 into which tynes 31 may be clamped by tightening the respective allen screw 110 which extends through an unthreaded lug 111 and a threaded lug 112 located either side of a slit 113 in the tube 43. The tyne holding tubes 44 are sized to closely co-operate with the tynes located therein and have an internal lip 114 at their upper end to prevent slippage of the tyne while it is being inserted into the ground. Similarly, the socket tube 37 is sized to closely cooperate with the stub 43 of the tyne arm to which it is clamped, an allen screw 115 which extends through an unthreaded lug 116 and a threaded lug 117 located either side of a slot 118 in the socket 37. The transverse spacing S between the tynes will typically be about 50 mm.

FIGS. 7 and 8 show a foot 36b having four tynes. This foot also has a central socket 37 adapted to be clamped to the stub 43 of a tyne arm 30. The four tyne holding tubes 44 are joined to the socket 37 by four webs 46 extending radially from the socket 37. The transverse spacing S between the tynes of FIG. 4 is also typically about 50 mm as is the longitudinal pitch P. The tynes may either be solid or hollow.

Each of the tyne holding tubes 44 is preferably provided with a bevelled lower edge 119 such that the "foot print" of the tyne holder is minimized. This has the effect of reducing the amount of soil which builds up on the lower surfaces of the tyne holder. Similarly the socket 37 preferably has an internally bevelled lower edge 120 and webs 46 of the four tyre holder of FIGS. 7 and 8 are also bevelled on their lower edges (not shown).

With the square grid pattern of tynes shown in FIG. 4 the foot can be moved forward after each stroke by a distance equal to the number of rows of tynes multiplied by their pitch P, that is, by twice the longitudinal spacing of the tynes in the foot, thereby providing a square grid pattern for aeration. Thus, for a given crankshaft speed, when using the arrangement of FIG. 4, the forward speed may be doubled compared to that of a single row tyne arrangement of FIG. 3 while still providing a square grid aeration pattern. If a square grid pattern is not required the arms can be moved forward by any selected distance between operations.

Referring to FIG. 9, mounted at spaced intervals transversely of the aerator are a series of buffers 50, the number of buffers corresponding to the number of tyne arms 30. The buffers are mounted on a transverse frame member 51 and each comprises a roller 52 rotatably mounted on support 53 by axle 54. As the arms 30 are brought forward in the slots 34 by springs 35 the buffers ensure that there is no jarring metal to metal contact during motion. If desired the rear of the slot may also be cushioned in some suitable fashion. It will be seen that each time the arm 30 strikes the buffer 50 the roller 52 presents a different part of its periphery for the next buffering action, thereby increasing the life of the roller. The rate of the return spring 35 is selected such that during high speed operation the tyne 31 will be brought back into engagement with the ground just before the arm reaches the buffer roller 52, while when the tynes are not engaging the ground, such as when the aerator is lifted clear of the ground during transport, the tyne arms move vertically in one position and roll past the rollers 52.

To ensure that turf is not lifted from the ground when the tynes are withdrawn, the aerator is provided with a guard 60. The guard 60 is secured to a member of the frame and extends from this member past the area over which the tynes operate. The guard, during use, is in contact with the ground and may be biased against it. The guard has a forward inclined portion 61 attached to the frame and a rear ground engaging portion 62, the free end of which has a turned up end 63, which enables the aerator to be reversed without the guard prohibiting such movement. The rear portion is formed with a series of arms which when viewed in plan appear as a comb (not shown). The respective arms of this portion extend between adjacent tynes of each foot and between the tynes of adjacent feet to ensure that withdrawal of the tynes does not result in lifting of the turf.

The operation of the aerator described with reference to FIGS. 1 to 9 is as follows. The crankshaft is caused to rotate in the direction of arrow A, such that each tyne arm bearing 32 will sequentially move towards bottom dead centre to engage its respective tynes in the ground. As the aerator advances, the bearing mount for each tyne arm bearing 32 will move rearwardly relative to the rest of the aerator due to rotation of the crankshaft and at the same time the tyne arm moves along the slots 34 against the action of springs 35 due to its engagement with the ground.

This action results in the tyne arms being maintained substantially vertical whilst the tynes are engaged in the ground. When each tyne is retracted from the ground by continued rotation of the crankshaft the springs 35 return the tyne arms to the forward end of the slots 34 ready for the next downward thrust. Although the tyne arms are maintained substantially vertically while the tynes are engaged with the ground a small amount of rocking motion of the tyne arm occurs, with the result that the core is effectively snapped off at the bottom of the stroke of the tyne arm, ensuring that practically all of the core is removed with the tyne. Without this snapping action, it is possible for cores to break off partway along their length as the tyne is withdrawn from the ground, such that part of the core is left in the core hole. The rocking motion of the tyne arm also tends to elongate the base of the core hole, thereby providing better penetration of air and nutrients.

The frame 11 may be adapted to be supported by a three point linkage with the crankshaft connected to a power take off of a towing vehicle such as a tractor. The drive for the crankshaft could be mechanical as illustrated or could be any other suitable drive such as hydraulic.

Figure 11:
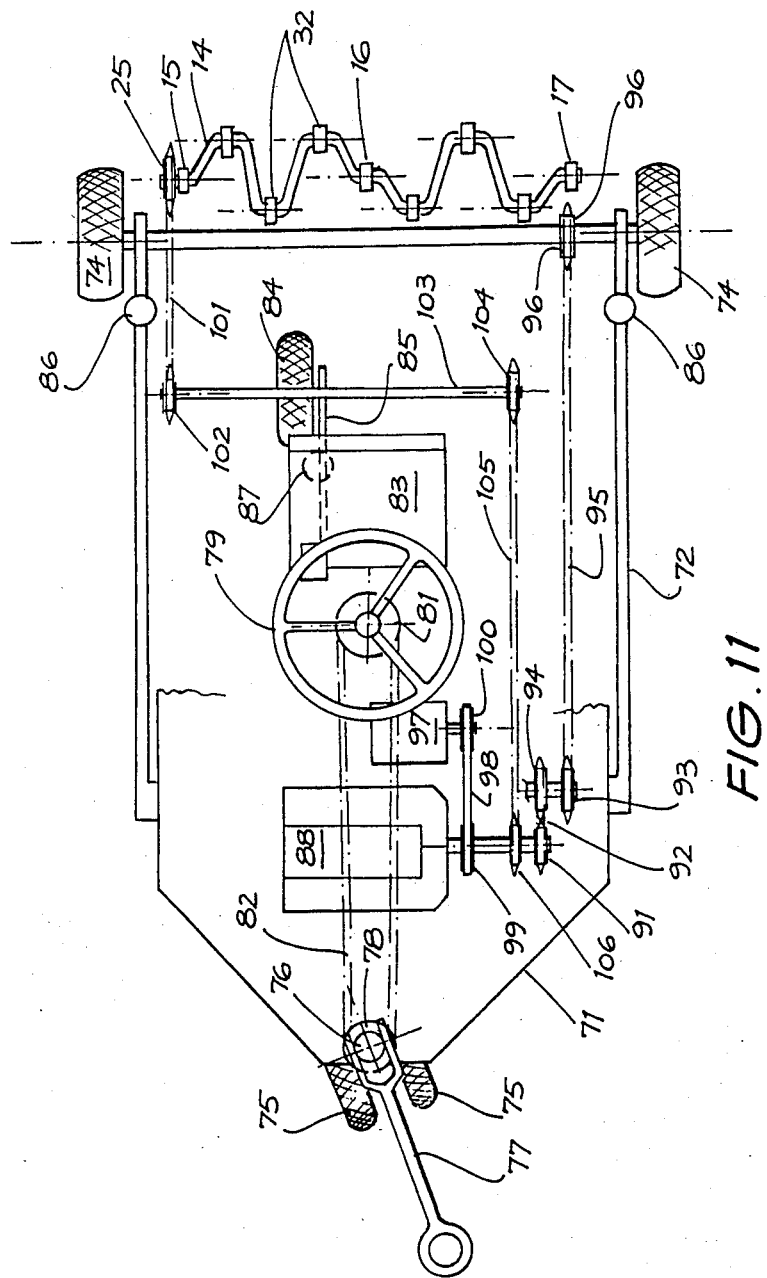
FIG. 11 schematically illustrates a plan view of the aerator of FIG. 10.

Referring now to FIGS. 10 and 11, a second embodiment of the invention is schematically illustrated wherein means are provided for self propulsion of the aerator. The aerator of the second embodiment has a chassis 71 to which are pivotally connected a pair of rearwardly extending arms 72. A rear axle 73 is rotatably mounted between the arms 72 and a pair of rear wheels 74, are mounted at the extremities of the axle, outboard of the arms 72. A pair of dolly wheels 75 are located centrally of the chassis 71 at the front end thereof. The dolly wheels are mounted on the lower end of a vertical steering shaft 76 which is rotatably connected to the chassis 71 and is provided with a tiller 77 pivotably connected to the top end thereof such that the tiller can be folded out of the way when not in use. A sprocket 78 on the steering shaft 76 is provided to communicate rotation of a steering wheel 79 to the steering shaft 76, the sprocket 78 being connected to a sprocket 81 fixedly coupled to the steering wheel 79 by a chain 82. The steering wheel 79 is located adjacent to a seat 83 which is provided for "ride on" operation, whereas the tiller 77 is provided for "pedestrian" operation. The self propelled aerator is also provided with an additional retractable wheel 84 mounted on a pivotable arm 85 and located inboard of the outermost tyne arm such that, with the retractable wheel in its lowered position, the aerator can core right up to the edge of depressions such as sand traps on golf courses and bowling green ditches. This feature is not required on the towed embodiment as it can be supported by the three point linkage of the tractor to which it is fitted if one wheel is suspended over the edge of a ditch or sand trap.

The height of the rear of the self propelled aerator, and therefore the penetration depth of the tynes, is adjusted using hydraulic rams 86 connected between the chassis 71 and respective arms 72, while the retractable wheel 84 can be lowered using a hydraulic ram 87 or alternatively it can be lowered by rotation of a threaded rod.

Power to drive the aerator is provided by an internal combustion engine 88 which would typically provide in the order of eight horsepower. A small fuel tank 89 is provided to supply fuel to the engine 88.

Transmission of power from the engine 88 to the rear wheels 74 is by chain drive, a first part of which comprises a sprocket 91 on the engine drive shaft, a chain 92, and a sprocket 93 mounted co-axially with the pivotal mounting point for the arms 72. A sprocket 94 which in connected to sprocket 93 drives a chain 95 which in turn drives a sprocket 96 on the rear axle 73. The connection between the sprockets 93 and 94 may be fixed, in which case only one forward speed will be possible, or alternatively the sprockets 93 and 94 may be connected through a gearbox in which case several forward speeds will be possible plus reverse. Multiple speeds can also be provided by providing a plurality of parallel chain drives each having a different sprocket ratio and each being provided with a clutch to allow selective engagement of one chain drive. It will be recognised that when reference is made to a drive speed of the aerator it is actually the ratio of forward speed to tyne operating speed which is referred to, and it is this ratio which determines the core pattern achieved by the machine. Absolute forward speed can be controlled by controlling the throttle of the engine 88 and a differential may also be provided on the rear axle or in the hub of one of the rear wheels to simplify turning of the aerator.

The pressure to operate the hydraulic cylinders 86 and 87 is provided by a hydraulic pump 96 which is driven from engine 88 through a V-belt 98 and a pair of pulleys 99, 100. The tyne arm drive of FIGS. 3, 10 and 11 is essentially identical to that described with reference to FIGS. 1 to 9 and will not be described in detail. The crankshaft 14 of the tyne arm drive is driven via a chain 101 which drives sprocket 25 and is driven by sprocket 102 mounted on a transverse shaft 103 having a sprocket 104 fitted to its other end. The sprocket 104 is in turn driven by chain 105 and sprocket 106 fitted to the drive shaft of engine 88.

I claim:

1. An aerating machine for turf, said aerating machine including:
   a supporting frame, including a three-point hitch connection adapted for connection to a tractor;
   a crankshaft including a plurality of cranks rotatably mounted relative to the frame and extending transversely of the direction of travel of the frame;
   a plurality of rigid tyne arms mounted relative to the crankshaft for reciprocation by the crankshaft;
   at least one tyne substantially rigidly mounted relative to each tyne arm;
   a transmission means mounted on the frame for rotating the crankshaft when the transmission means is driven, the transmission means including connection means for connection to a power take off of a tractor;

a guide means substantially enclosing the lower portion of the frame adjacent the tynes and for restraining the lateral movement of the tyne arms, said guide means comprising a horizontal guide plate means defining a plurality of slots within which the lower ends of respective tyne arms reciprocate vertically and longitudinally of the frame such that, with forward motion of the operating machine, the tynes may remain stationary, horizontally, relative to the turf when the tynes are in the turf and the aerating machine is moving forward;

each said guide means including a stop means disposed substantially vertically aligned with the forwardmost position of rotation on the crank tyne connections; and a tyne arm spring return means for returning a lower end of the tyne arm to a forward position, when the respective tyne is removed from the ground, at a rate substantially equal to the rate of forward motion of an upper end of the respective tyne arm, due to the rotation of the crankshaft, said crankshaft being rotatable in the same direction as the forward direction of movement to cause the tyne arms to reciprocate in a substantially vertical direction relative to the turf when the aerating machine is travelling in the forward direction, whereby the tynes are projected into and withdrawn from the turf, the tynes being maintained stationary, horizontally, relative to the turf, and substantially perpendicular to the turf, when the tynes are in the turf and the aerating machine is moving.

2. The aerating machine of claim 1 wherein said tynes are mounted relative to the tyne arms by tyne clamps secured to the arms.

3. The aerating machine of claim 2 wherein the tyne clamps are removably secured to the arms.

4. The aerating machine of claim 3 wherein said tyne clamps include a sleeve for receiving an end of a respective said arm and the end is secured to the sleeve by a fastener.

5. The aerating machine of claim 1 wherein lower faces of the tyne clamps slope substantially outwardly and upwardly to prevent soil build up under the clamps when they are in use.

6. The aerating machine of claim 1 wherein at least two ground-engaging wheels are adjustably mounted to the frame whereby the wheels may be moved between a transport position with the tynes free of the turf to an operating position in which the degree of penetration of the tynes with the ground may be adjusted.

7. The aerating machine of claim 6 wherein the guard means have a forward portion securable to the frame and a rear portion which, in use, engages the turf, said rear portion having a plurality of fingers a respective one of which extends between adjacent ones of said tynes.

8. The aerating machine of claim 1, including guard means secured to the frame and having portions extending between the tynes to prevent the tynes from lifting turf as the tynes are withdrawn from the ground.

9. The aerating machine of claim 1 wherein the tynes are hollow.

* * * * *